United States Patent
Yokoyama

(10) Patent No.: US 8,480,318 B2
(45) Date of Patent: Jul. 9, 2013

(54) DRIVING FORCE TRANSMITTING DEVICE AND CAMERA PLATFORM DEVICE USING THE SAME

(75) Inventor: Akira Yokoyama, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/076,535

(22) Filed: Mar. 31, 2011

(65) Prior Publication Data

US 2011/0243549 A1  Oct. 6, 2011

(30) Foreign Application Priority Data

Mar. 31, 2010  (JP) ................. 2010-081604

(51) Int. Cl.
 *G03B 17/00* (2006.01)
 *H02P 1/54* (2006.01)

(52) U.S. Cl.
 USPC ................. 396/428; 318/54; 318/59

(58) Field of Classification Search
 USPC ................. 396/419, 428; 318/34, 35, 37, 38, 318/45, 47, 51, 54, 56, 59–63, 86, 87, 375, 318/376, 625, 370–371
 See application file for complete search history.

(56) References Cited

U.S. PATENT DOCUMENTS

| | | | | |
|---|---|---|---|---|
| 4,323,828 A * | 4/1982 | Terada et al. | ................. | 318/45 |
| 6,580,244 B2 * | 6/2003 | Tanaka et al. | ................. | 318/560 |
| 2007/0264004 A1 * | 11/2007 | Daggett | ................. | 396/322 |

FOREIGN PATENT DOCUMENTS

| | | |
|---|---|---|
| JP | 58-065367 A | 4/1983 |
| JP | 63-260741 A | 10/1988 |
| JP | 2006-211813 A | 8/2006 |
| JP | 3820546 B2 | 9/2006 |

OTHER PUBLICATIONS

JP2006-211813 (A) Machine Translation available from JPO website.*

* cited by examiner

*Primary Examiner* — W B Perkey
*Assistant Examiner* — Minh Phan
(74) *Attorney, Agent, or Firm* — Rossi, Kimms & McDowell LLP

(57) ABSTRACT

A driving force transmitting device for driving a driven unit includes a first driving unit, a second driving unit, a driving force-transmitted portion which is attached to the driven unit and to which driving forces of the first and second driving units are transmitted, and a controlling unit for separately controlling the first and second driving units, wherein driving force transmitting portions of the first and second driving units transmit the driving forces to the driving force-transmitted portion at its different positions, and wherein when the driven unit being driven is to be stopped, the controlling unit causes the first driving unit to drive in a direction reverse to a driving direction while the second driving unit continues to drive, then causes the first and second driving units to stop in a state in which the driving forces of the first and second driving units are balanced with each other.

21 Claims, 16 Drawing Sheets

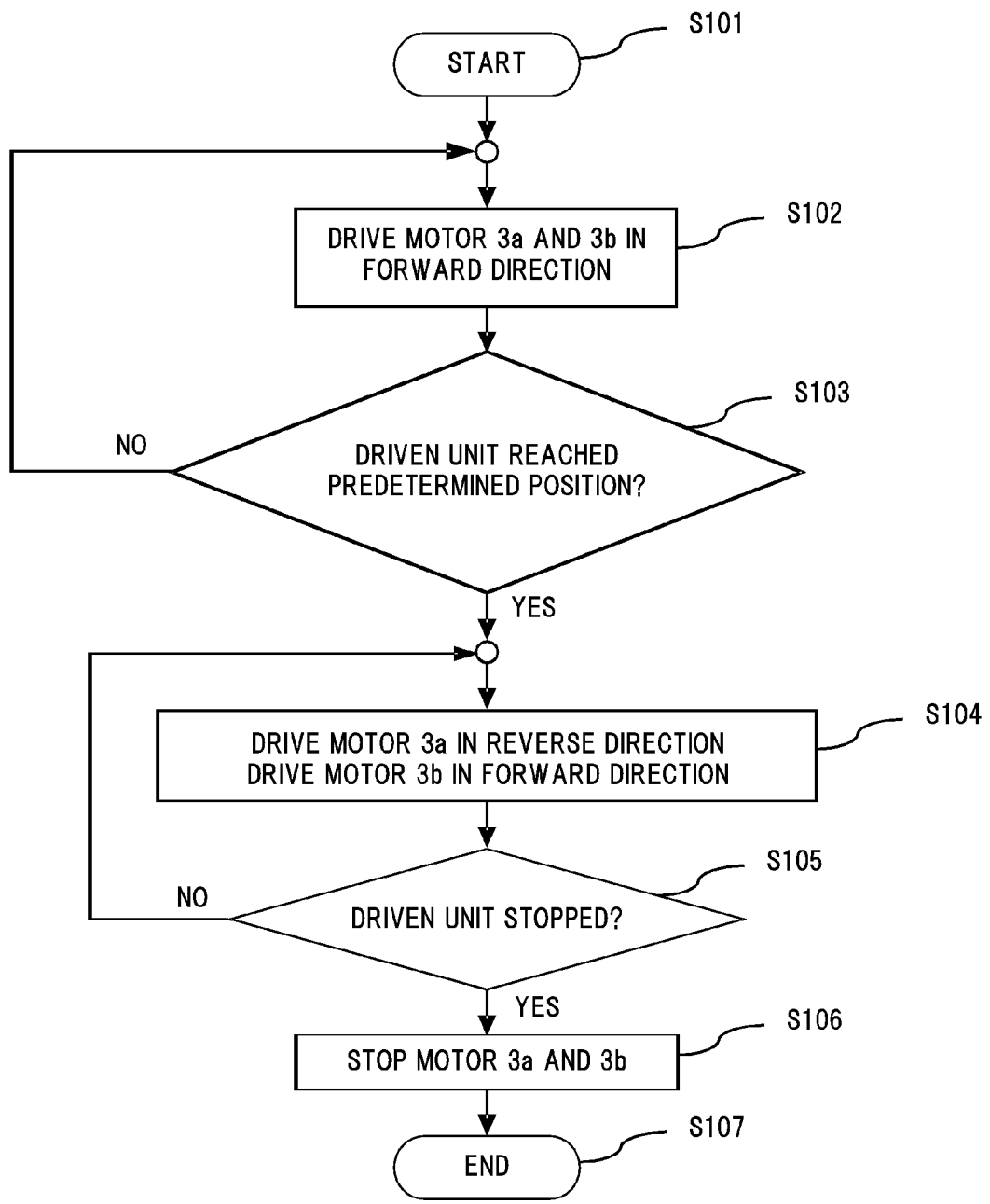

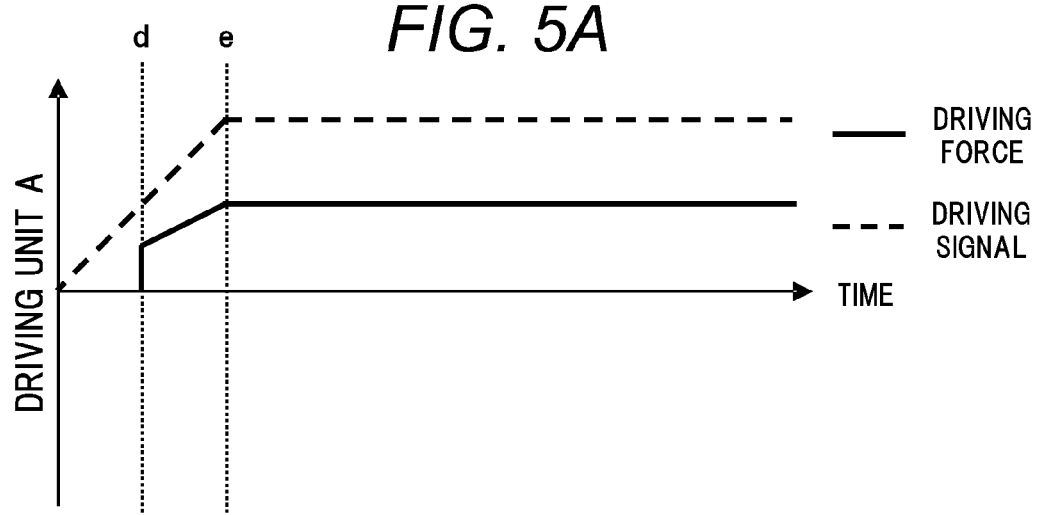
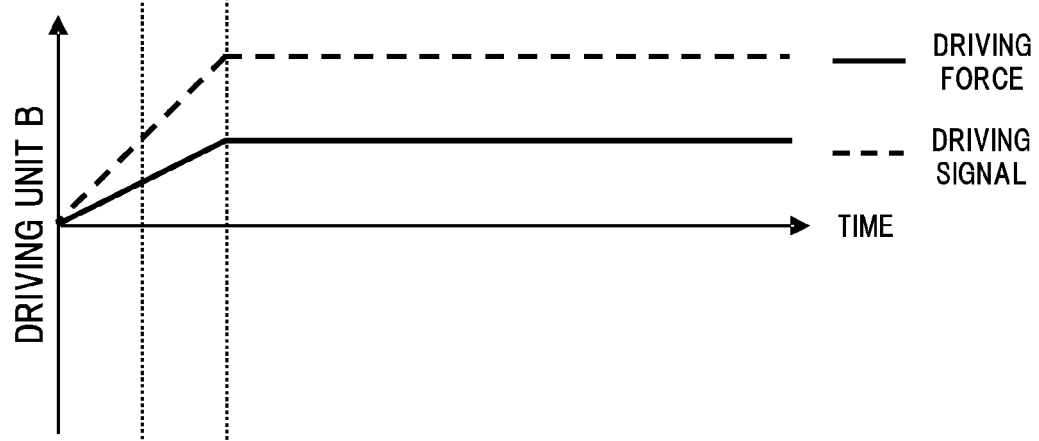
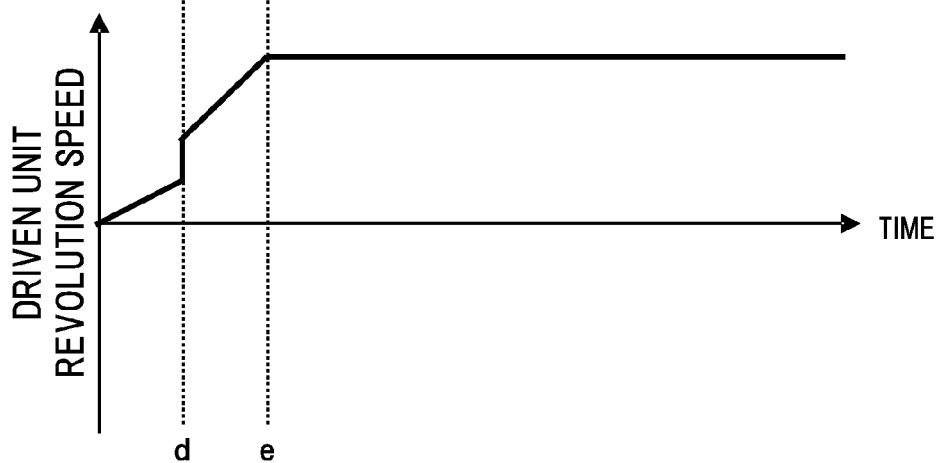

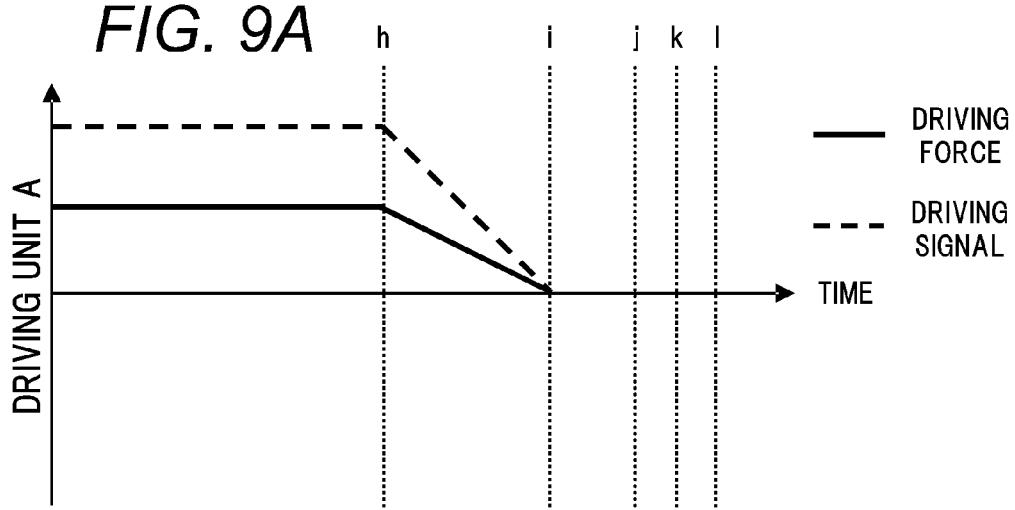
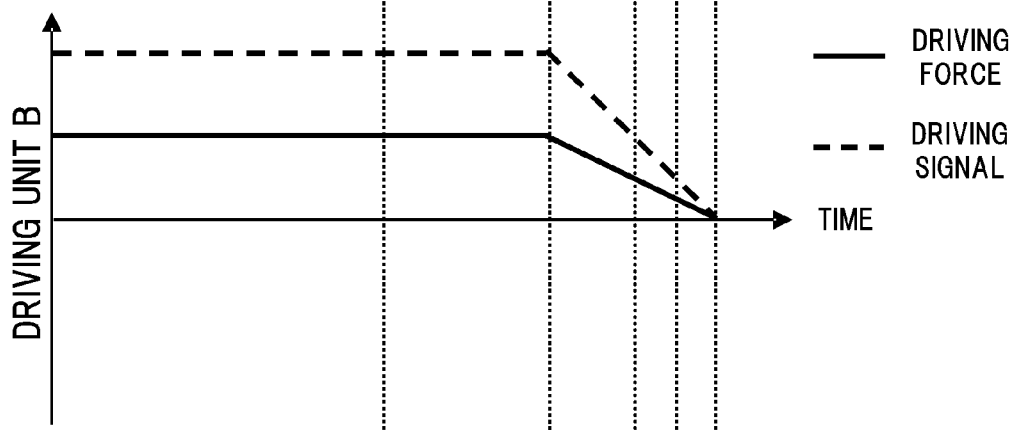
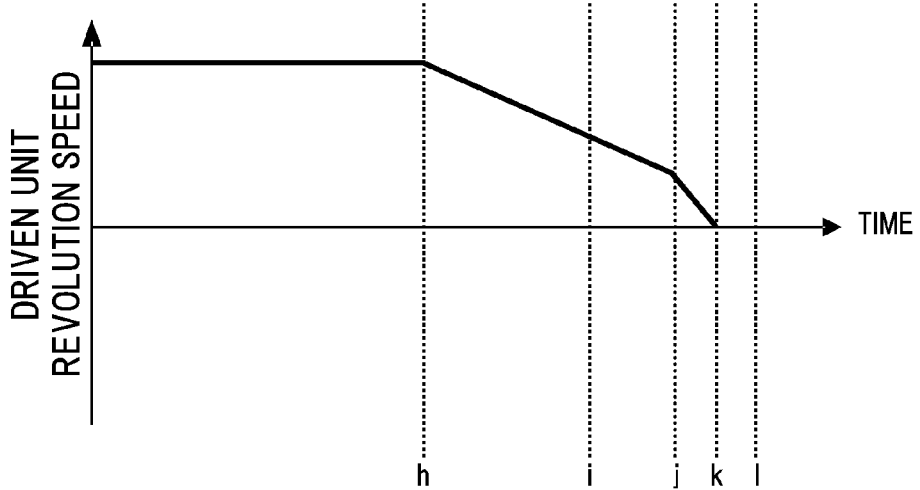

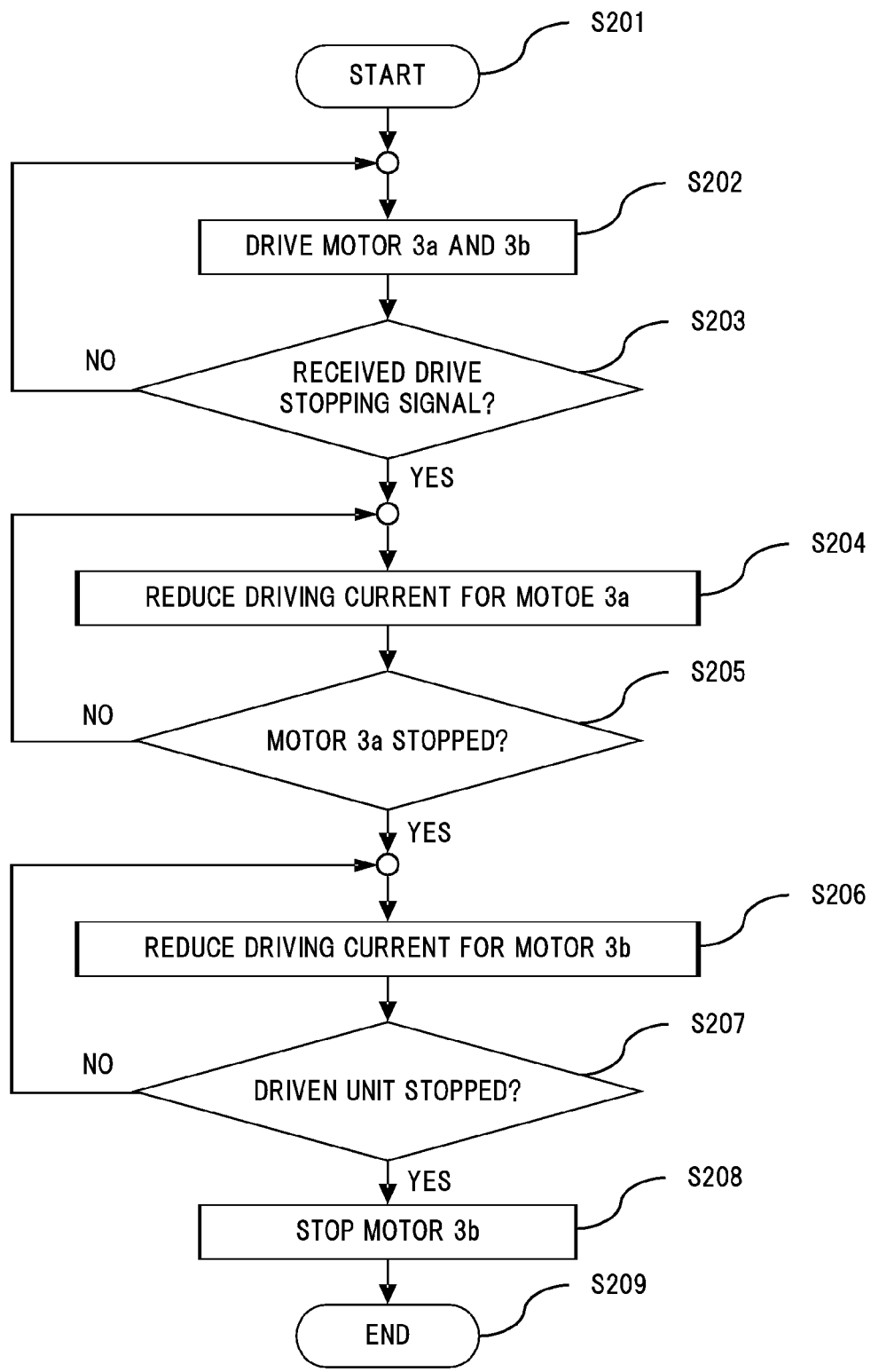

DRIVING FORCE TRANSMITTING DEVICE AND CAMERA PLATFORM DEVICE USING THE SAME

BACKGROUND OF THE INVENTION

1. Field of the Invention

The present invention relates to a driving force transmitting device for driving a driven unit by two driving units and a camera platform device using the driving force transmitting device.

2. Description of the Related Art

A general mechanism for driving a driven unit by a driving force of a motor via a reducer using a gear or a belt has a driving dead band, which is called backlash or lost motion. The dead band causes such a problem that the start of driving of the driven unit is delayed by a dead band amount when the reverse rotating motion of the motor is performed after the driving is completed once.

In order to solve this problem, in Japanese Patent No. 3,820,546, data obtained by measuring dead band amounts at multiple positions of the reducer is stored, and a speed of a driving source is increased for a period of the dead band after the reverse rotating motion started, to thereby reduce the delay of the driving which is caused by the dead band.

There is also a problem in that the driven unit might be moved by the dead band amount by an external force applied to the driven unit after stopped once and thus shifted from an intended rest position.

In order to solve this problem, in Japanese Patent Application Laid-Open No. 2006-211813, multiple driving sources are stopped at different timings based on a maximum dead band amount to vary dead band amounts and their directions with respect to the driving sources and a driven member, to thereby reduce a position deviation caused by the external force.

In Japanese Patent No. 3,820,546, the dead band amounts are measured to reduce the delay of the driving which is caused by the dead band. However, the following problem is not solved: the driven unit might be moved after stopped once by the dead band amount by the external force applied to the driven unit during the driven unit is rest and thus shifted from the intended rest position.

In Japanese Patent Application Laid-Open No. 2006-211813, when the measured maximum dead band amounts is increased by an impact applied to a device or the wearing of a reducing mechanism, there arises a fear in that an effect of preventing the position deviation caused by the external force may be reduced.

SUMMARY OF THE INVENTION

Therefore, an exemplary object of the present invention is to provide a driving force transmitting device in which a dead band amount of a driving system at the rest is continuously reduced without measuring the dead band amount, to thereby reduce the delay of the driving and reduce the position deviation caused by an external force at the rest.

In order to achieve the above-mentioned object, a driving force transmitting device for driving a driven unit according to the present invention includes a first driving unit, a second driving unit, a driving force-transmitted portion which is attached to the driven unit and to which a driving force of the first driving unit and a driving force of the second driving unit are transmitted, and a controlling unit for separately controlling the first driving unit and the second driving unit, in which a driving force transmitting portion of the first driving unit and a driving force transmitting portion of the second driving unit transmit the driving forces to the driving force-transmitted portion at different positions of the driving force-transmitted portion; and in which when the driven unit which is being driven is to be stopped, the controlling unit causes the first driving unit to drive in a direction reverse to a driving direction while the second driving unit continues to drive, and then causes the first driving unit and the second driving unit to stop in a state in which the driving forces of the first driving unit and the second driving unit are balanced with each other.

Further, a driving force transmitting device for driving a driven unit according to another embodiment of the present invention includes a first driving unit, a second driving unit, a driving force-transmitted portion which is attached to the driven unit and to which a driving force of the first driving unit and a driving force of the second driving unit are transmitted, and a controlling unit for separately controlling the first driving unit and the second driving unit, in which a driving force transmitting portion of the first driving unit and a driving force transmitting portion of the second driving unit transmit the driving forces to the driving force-transmitted portion at different positions of the driving force-transmitted portion, and in which when the driven unit which is being driven is to be stopped, the controlling unit gradually reduces the driving force of the first driving unit to stop the first driving unit while the second driving unit continues to drive, then gradually reduces the driving force of the second driving unit to drive the first driving unit as a load with the driving force of the second driving unit, and then causes the second driving unit to stop.

Further features of the present invention will become apparent from the following description of exemplary embodiments with reference to the attached drawings.

According to the present invention, an effect of continuously reducing the dead band amount of the driving system at the rest is obtained without measuring the dead band amount of the driving force transmitting mechanism.

BRIEF DESCRIPTION OF THE DRAWINGS

FIG. 3 is a flow chart illustrating an operation of the driving force transmitting mechanism according to the first embodiment of the present invention at the time of coming to a stop.

FIG. 4B illustrates a state of driving force transmission between the driven gear and the outputting gears at a time a.

FIG. 5A is a graph illustrating a behavior of the driving unit A in a case where the driving force transmitting mechanism according to the present invention restarts to start a forward operation.

FIG. 5B is a graph illustrating a behavior of the driving unit B in the case where the driving force transmitting mechanism according to the present invention restarts to start the forward operation.

FIG. 5C is a graph illustrating a behavior of the driven unit in the case where the driving force transmitting mechanism according to the present invention restarts to start the forward operation.

FIG. 9A is a graph illustrating a behavior of a driving unit A of a driving force transmitting mechanism according to a second embodiment of the present invention at the time of coming to a stop.

FIG. 9B is a graph illustrating a behavior of a driving unit B of the driving force transmitting mechanism according to the second embodiment of the present invention at the time of coming to a stop.

FIG. 9C is a graph illustrating a behavior of a driven unit of the driving force transmitting mechanism according to the second embodiment of the present invention at the time of coming to a stop.

FIG. 10 is a flow chart illustrating an operation of the driving force transmitting mechanism according to the second embodiment of the present invention at the time of coming to a stop.

DESCRIPTION OF THE EMBODIMENTS

Hereinafter, embodiments of the present invention are described in detail with reference to the attached drawings.

First Embodiment

A first embodiment of the present invention is described with reference to FIGS. 1 to 11A and 11B.

Figure 1:
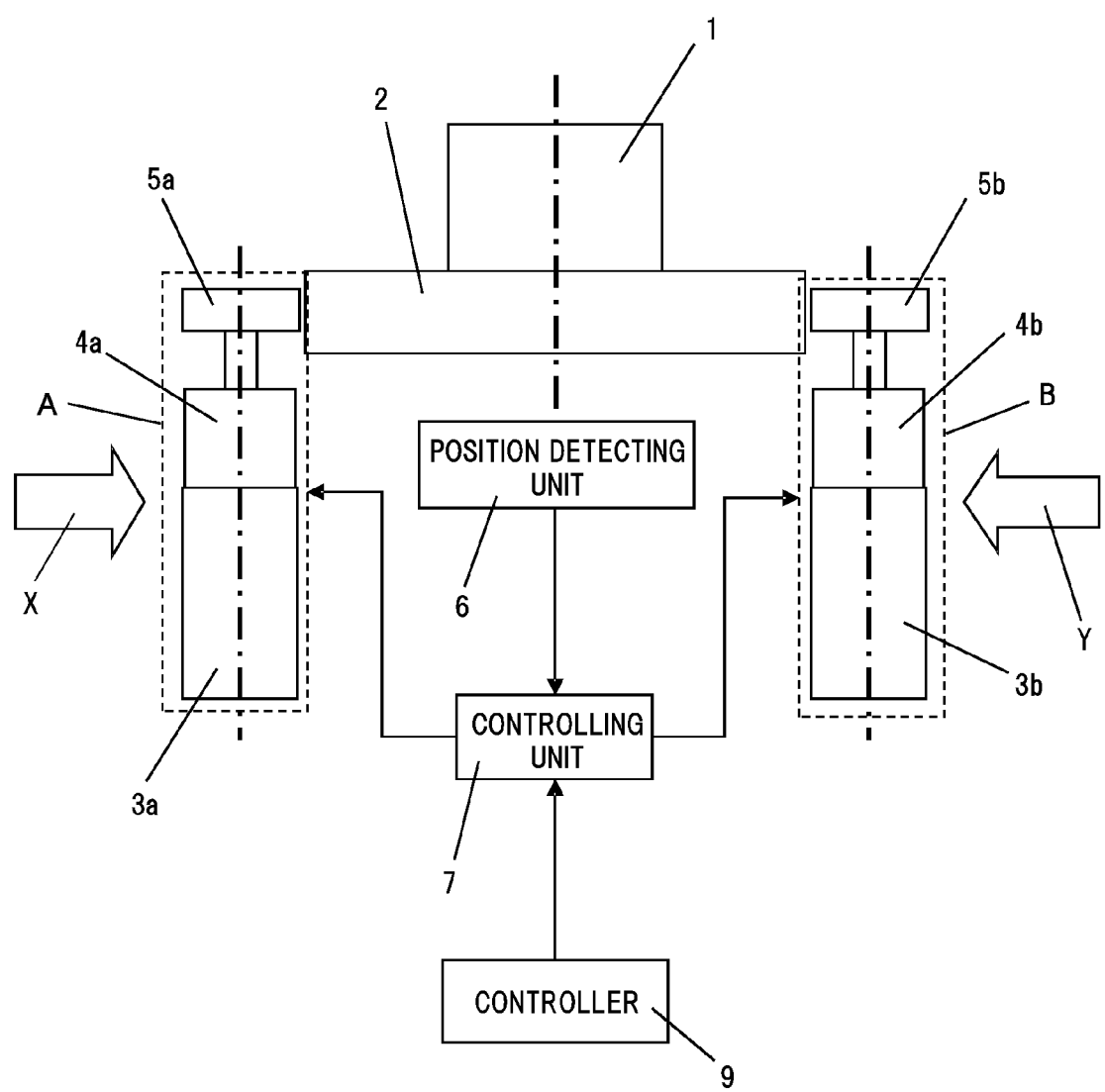
FIG. 1 illustrates a typical structure of a driving force transmitting mechanism according to the present invention.

FIG. 1 illustrates a typical structure of a driving force transmitting mechanism according to the present invention.

A driven unit 1 is attached to a driven gear 2. A position detecting unit 6 is provided to detect a rotational position.

A driving unit A (first driving unit) includes a DC motor 3a, a reducer 4a, and an outputting gear (driving force transmitter) 5a. A driving unit B (second driving unit) includes a DC motor 3b, a reducer 4b, and an outputting gear (driving force transmitter) 5b. The outputting gear 5a transmits a driving force of the DC motor 3a to the driven gear 2 (driving force-transmitted portion). The outputting gear 5b transmits a driving force of the DC motor 3b to the driven gear 2.

A controlling unit 7 separately controls the behaviors of the driving unit A and the driving unit B in response to commands from a controller (commanding unit) 9.

The driving unit A is urged by an elastic member toward the center of the driven gear 2 in a direction indicated by the arrow X to reduce backlash (clearance) between the outputting gear 5a and the driven gear 2. The driving unit B is urged by an elastic member toward the center of the driven gear 2 in a direction indicated by the arrow Y to reduce backlash between the outputting gear 5b and the driven gear 2. In order to transmit the driving forces of the DC motors 3a and 3b to the driven unit 1 to drive the driven unit 1 in the driving direction, a state in which there is not backlash in the driving direction, which exists between the DC motors 3a and 3b and the driven unit 1, is required. In the structure according to this embodiment, backlashes exist in the reducers 4a and 4b and between the outputting gears 5a and 5b and the driven gear 2. However, hereinafter, the backlashes are collectively referred to as a backlash.

Figure 2A:
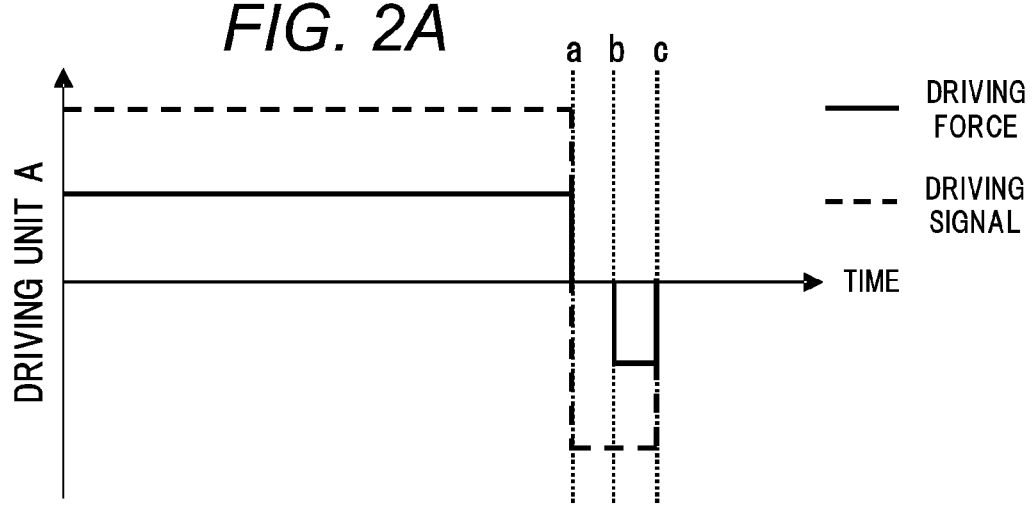
FIG. 2A is a graph illustrating a behavior of a driving unit A of a driving force transmitting mechanism according to a first embodiment of the present invention at a time of coming to a stop.
Figure 2B:
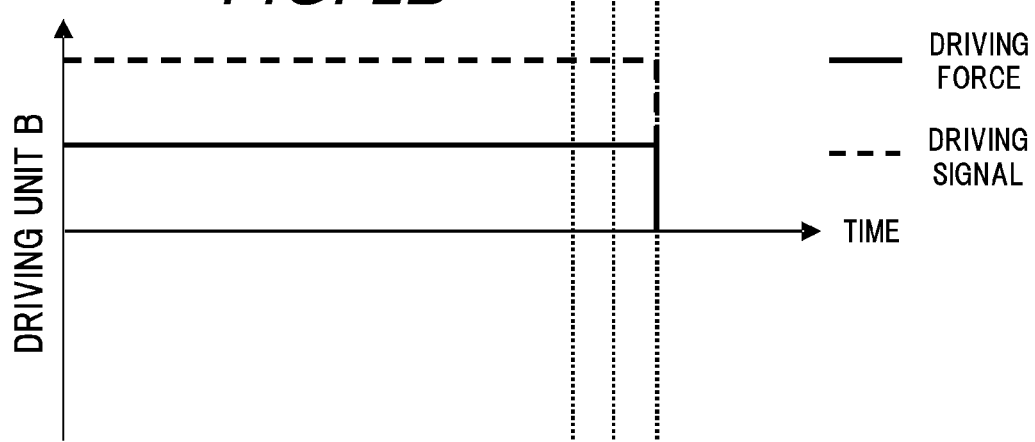
FIG. 2B is a graph illustrating a behavior of a driving unit B of the driving force transmitting mechanism according to the first embodiment of the present invention at the time of coming to a stop.
Figure 2C:
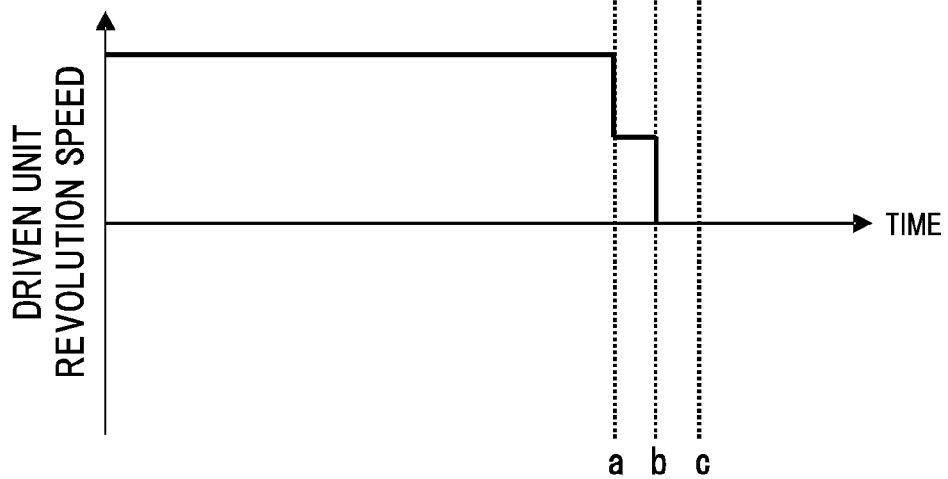
FIG. 2C is a graph illustrating a behavior of a driven unit of the driving force transmitting mechanism according to the first embodiment of the present invention at the time of coming to a stop.

FIGS. 2A, 2B, and 2C are graphs illustrating behavior relationships between the driven unit 1 and the driving units A and B in a case where the driving force transmitting mechanism according to this embodiment comes to a stop.

FIG. 2A illustrates a motor driving signal of the driving unit A and a driving force applied from the outputting gear 5a to the driven gear 2. FIG. 2B illustrates a motor driving signal of the driving unit B and a driving force applied from the outputting gear 5b to the driven gear 2. FIG. 2C illustrates a revolution speed of the driven unit 1.

FIG. 3 illustrates an operation flow in this embodiment.

In Step S101 illustrated in FIG. 3, the controller 9 outputs, to the controlling unit 7, a commanding signal for starting the driving to a stop target position. In Step S102, the controlling unit 7 outputs a commanding signal for starting the operations of the driving units A and B to drive the DC motors 3a and 3b.

In Step S103, the controlling unit 7 determines whether or not the driven unit 1 reached a stopping motion starting position (P1) (position of driven unit 1 at time a illustrated in FIGS. 2A, 2B, and 2C) preceding the stop target position by a predetermined amount based on rotational position information on the driven gear 2 which is input from the position detecting unit 6. In the case that the driven unit 1 reached the stopping motion starting position (P1), the processing proceeds to Step S104. In Step S104, the DC motor 3a starts to drive in a reverse direction and the DC motor 3b continues to drive in a forward direction. In contrast to this, in Step S103, in the case that the driven unit 1 did not reach the stopping motion starting position (P1), the processing returns to Step S102 and the DC motors 3a and 3b continue to drive in the forward direction.

After the DC motor 3a had started to drive in the reverse direction in Step S104, whether or not the driven unit 1 stopped is determined in Step S105. In the case that the driven unit 1 did not stop, the processing returns to Step S104, and then the DC motor 3a continues to drive in the reverse direction and the DC motor 3b continues to drive in the forward direction. In the case that the driven unit 1 stopped (time b) in Step S105, the processing proceeds to Step S106. Then, the controlling unit 7 causes the DC motors 3a and 3b to stop. In Step S107, the operation is ended.

Figure 4A:
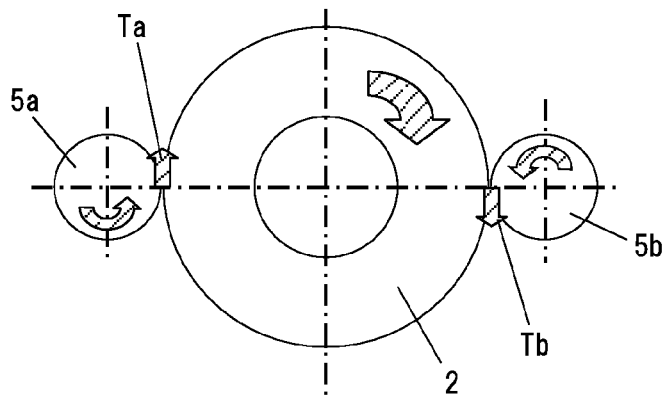
FIG. 4A illustrates a state of driving force transmission between a driven gear and outputting gears during a steady operation.

FIG. 4A illustrates a state of driving force transmission between the driven gear 2 and the outputting gears 5a and 5b during a steady operation. The arrow Ta indicates a direction in which the outputting gear 5a exerts a driving force on the driven gear 2 and the arrow Tb indicates a direction in which the outputting gear 5b exerts a driving force on the driven gear 2. That is, the driving units A and B have no backlash in the directions indicated by the arrows Ta and Tb, respectively. Backlash exists in directions reverse to the direction indicated by the arrows Ta and Tb.

In FIGS. 2A, 2B, and 2C, at the time a when the driven unit 1 reaches the stopping motion starting position (P1) preceding the stop target position by the predetermined amount (Step S103), an equal magnitude driving signal for performing the reverse rotating motion is input to the driving unit A (Step S104). On the other hand, the same signal as before the time a is continuously input to the driving unit B, and hence the driving unit B continues to drive in the forward direction.

Figure 4B:
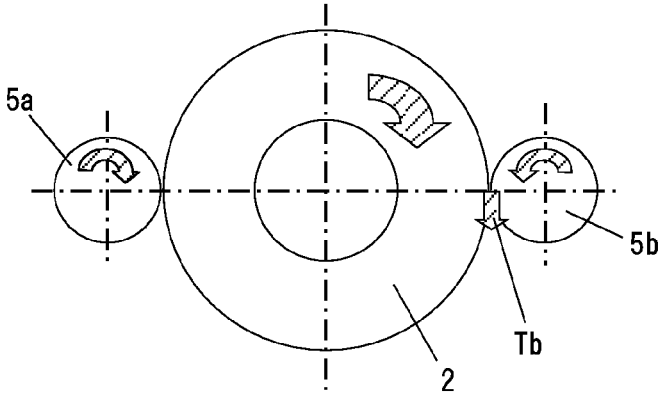

FIG. 4B illustrates a state of driving force transmission between the driven gear 2 and the outputting gears 5a and 5b during this period (between time a and time b). The outputting gear 5b of the driving unit B continues to rotate in the forward direction and there is no backlash in the direction indicated by the arrow Tb (forward rotational direction of outputting gear 5b). In contrast to this, the DC motor 3a of the driving unit A starts the reverse rotating motion, and hence no motor force of the DC motor 3a is transferred to the outputting gear 5a because the backlash of the driving unit A. During the period between the times a and b, the driving unit A has the backlash in both driving directions, the forward rotational direction and the reverse rotational direction.

Figure 4C:
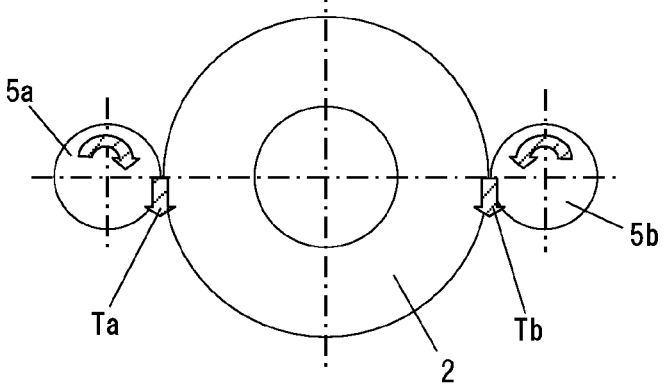
FIG. 4C illustrates a state of driving force transmission between the driven gear and the outputting gears at a time b.

At the time b illustrated in FIGS. 2A, 2B, and 2C, the driving of the DC motor 3a in the reverse rotating direction reaches a limit of the backlash band, and hence there is no backlash in the direction indicated by the arrow Ta. Therefore, the power of the DC motor 3a is transferred to the outputting gear 5a. FIG. 4C illustrates a state of driving force transmission between the driven gear 2 and the outputting gears 5a and 5b at this time. The equal magnitude current as in the DC motor 3b flows into the DC motor 3a in the reverse direction, and hence the driving units A and B generate driving forces which are reverse in direction to each other and equal in magnitude to each other. Therefore, the driving force of the driving unit A is balanced with the driving force of the driving unit B, hence the driven gear 2 stops (Step S105).

Figure 4D:
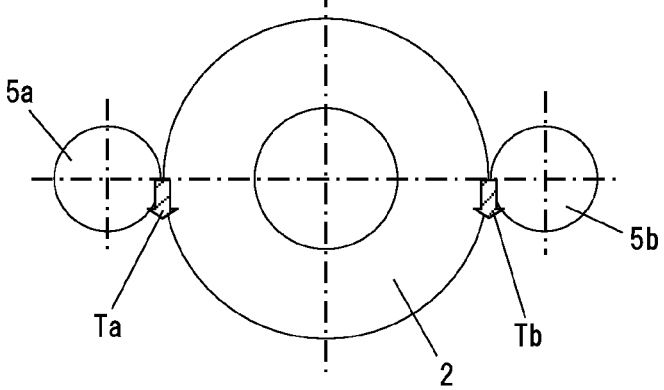
FIG. 4D illustrates a state of the driven gear and the outputting gears at the time of stopping.

After the stop of the driven gear 2, at a time c illustrated in FIGS. 2A, 2B, and 2C, the currents input to the DC motors 3a and 3b are cut off (Step S106) and the driven gear 2 remains at rest (Step S107). At this time, the direction Ta of the force applied from the outputting gear 5a of the driving unit A to the driven gear 2 is reverse to the direction Tb of the force applied from the outputting gear 5b of the driving unit B to the driven gear 2. Therefore, the rotation of the driven gear 2 is held from both the rotational directions. FIG. 4D illustrates a state of the driven gear 2 and the outputting gears 5a and 5b at this time.

In a case where the motors are locked with this state, even when an external force is applied to the driven unit 1, driving shafts (driving units) of the motors do not rotate and the driven gear 2 remains at rest. The DC motors 3a and 3b may be locked by short-circuiting between two electrodes in each of the DC motors 3a and 3b.

Hereinafter, a case where the driving force transmitting mechanism restarts in the forward direction from the stop state illustrated in FIG. 4D is described.

FIGS. 5A, 5B, and 5C are graphs illustrating behavior relationships between the driven unit 1 and the driving units A and B in the case where the driving force transmitting mechanism according to the present invention restarts in the forward direction.

FIG. 5A illustrates the motor driving signal of the driving unit A and the driving force applied from the outputting gear 5a to the driven gear 2. FIG. 5B illustrates the motor driving signal of the driving unit B and the driving force applied from the outputting gear 5b to the driven gear 2. FIG. 5C illustrates the revolution speed of the driven unit 1.

Figure 6:
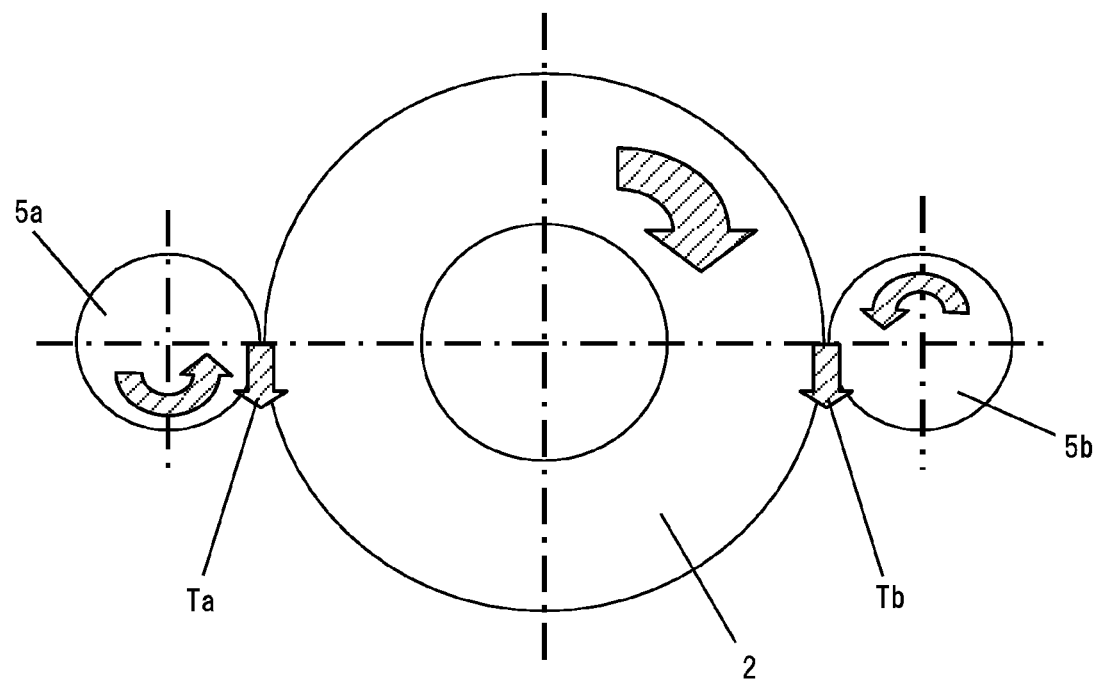
FIG. 6 illustrates a state of driving force transmission between the driven gear and the outputting gears in the case where the driving force transmitting mechanism according to the present invention restarts to start the forward operation.

When the same driving current is simultaneously input to the driving units A and B, as illustrated in FIG. 6, the driving force of the driving unit B which is in a state in which there is no backlash in the behavior direction at this time is transmitted to the driven gear 2 through the outputting gear 5b. In contrast to this, the driving unit A starts to drive from the state in which there is no backlash in the direction reverse to the driving direction, and hence the DC motor 3a rotates with no load until the driving of the DC motor 3a reached a limit of the backlash band on the driving direction side. The DC motor 3a of the driving unit A has no load, and hence the DC motor 3a rotates more rapidly than the DC motor 3b of the driving unit B into which the same driving current flows. At a time d illustrated in FIGS. 5A, 5B, and 5C, the rotation of the outputting gear 5a matches with the rotation of the outputting gear 5b, and hence the backlash of the driving unit A on the driving direction side is eliminated.

After that, the driving units A and B have behaviors to obtain the combination of the driving forces thereof. After the completion of required acceleration, the steady operation starts at a time e illustrated in FIGS. 5A, 5B, and 5C.

Hereinafter, a case where the driving force transmitting mechanism restarts in the reverse rotating direction from the stop state illustrated in FIG. 4D is described.

Figure 7A:
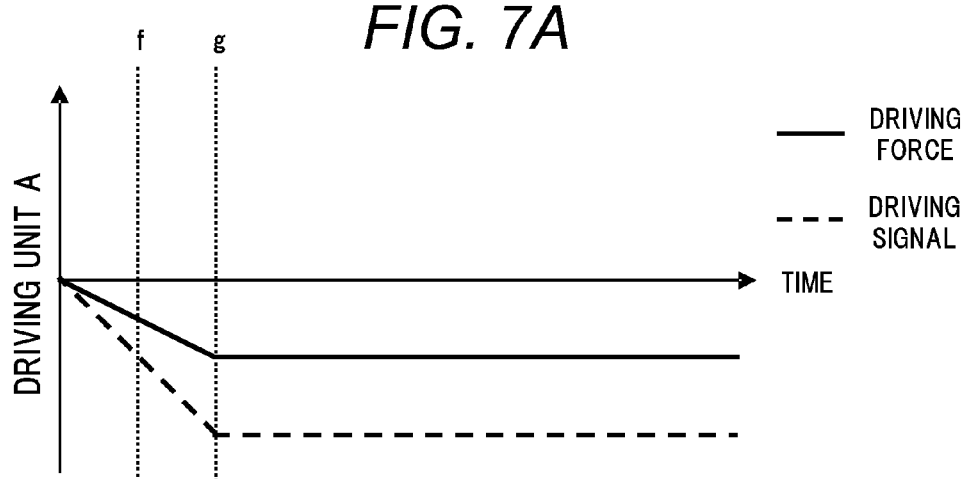
FIG. 7A is a graph illustrating a behavior of the driving unit A in a case where the driving force transmitting mechanism according to the present invention restarts to start a reverse operation.
Figure 7B:
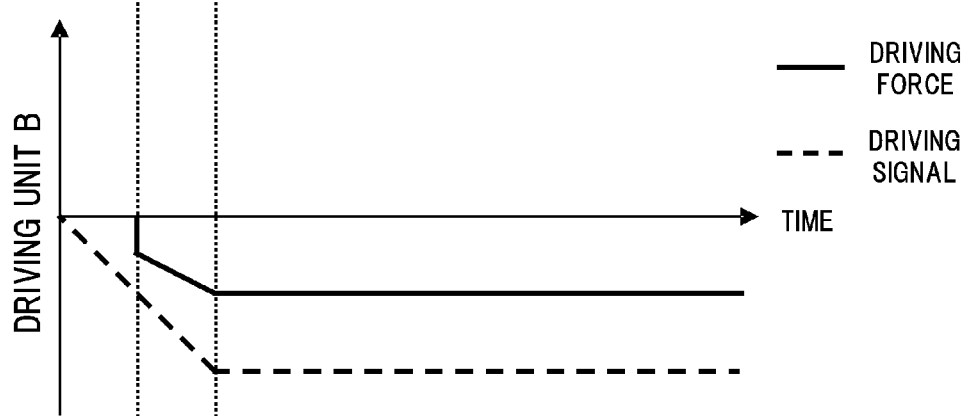
FIG. 7B is a graph illustrating a behavior of the driving unit B in the case where the driving force transmitting mechanism according to the present invention restarts to start the reverse operation.
Figure 7C:
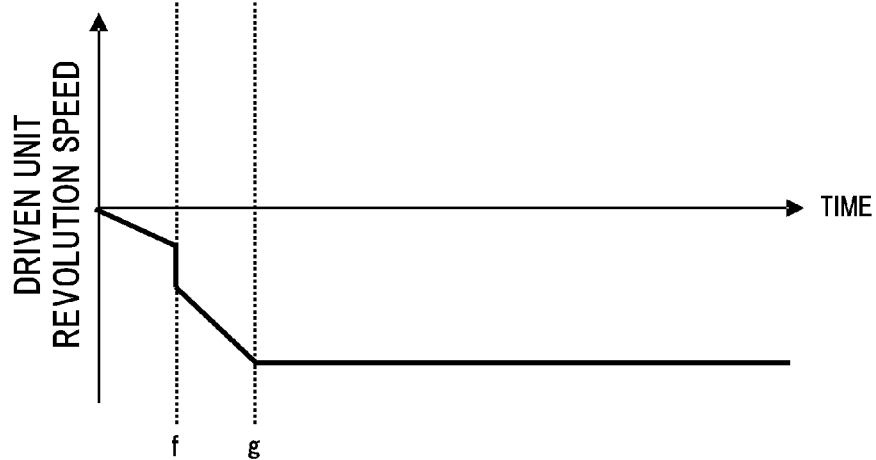
FIG. 7C is a graph illustrating a behavior of the driven unit in the case where the driving force transmitting mechanism according to the present invention restarts to start the reverse operation.

FIGS. 7A, 7B, and 7C are graphs illustrating behavior relationships between the driven unit 1 and the driving units A and B in the case where the driving force transmitting mechanism according to the present invention restarts in the reverse direction.

FIG. 7A illustrates the motor driving signal of the driving unit A and the driving force applied from the outputting gear 5a to the driven gear 2. FIG. 7B illustrates the motor driving signal of the driving unit B and the driving force applied from the outputting gear 5b to the driven gear 2. FIG. 7C illustrates the revolution speed of the driven unit 1.

Figure 8:
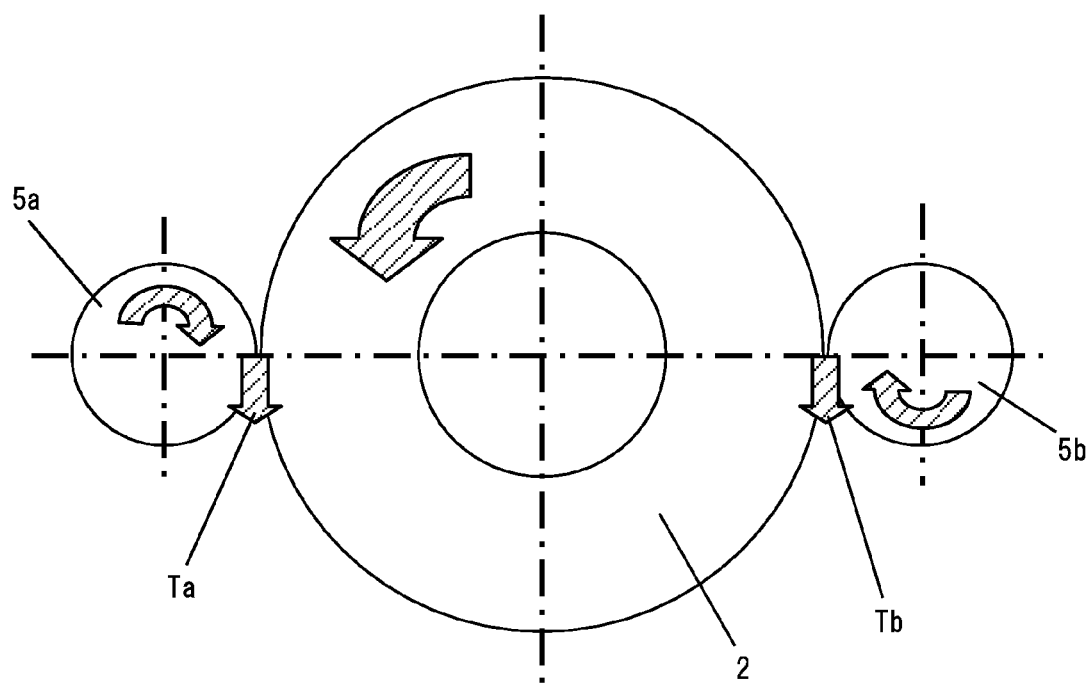
FIG. 8 illustrates a state of driving force transmission between the driven gear and the outputting gears in the case where the driving force transmitting mechanism according to the present invention restarts to start the reverse operation.

When the same driving current is simultaneously input to the driving units A and B, as illustrated in FIG. 8, the driving force of the driving unit A which is in a state in which there is no backlash in the reverse direction because of the reverse rotation at the time of coming to a stop is transmitted to the driven gear 2 through the outputting gear 5a. In contrast to this, the driving unit B starts to drive from the state in which there is no backlash in the direction reverse to the driving direction, and hence the DC motor 3b rotates with no load until the driving of the DC motor 3b reaches a limit of the backlash band on the driving direction side. The DC motor 3b of the driving unit B has no load, and hence the DC motor 3b rotates more rapidly than the DC motor 3a of the driving unit A into which the same driving current flows. At a time f illustrated in FIGS. 7A, 7B, and 7C, the rotation of the outputting gear 5b matches with the rotation of the outputting gear 5a, and hence the backlash of the driving unit B on the driving direction side is eliminated.

After that, the driving units A and B have behaviors to obtain the combination of the driving forces. After the completion of required acceleration, the steady operation starts from a time g illustrated in FIGS. 7A, 7B, and 7C.

As described above, according to the first embodiment of the present invention, one of the driving units performs the reverse rotating motion at the time of coming to a stop and stops in the state in which the balance with the driving force of the other driving unit is achieved. Therefore, the driven gear can stop at a desired position more rapidly than in the case where the reverse rotating motion is not performed. The behavior is performed until the driving forces of the two driving units are balanced, and hence the driven gear may be reliably held on both sides for stopping without depending on the backlash amount.

There is no backlash in any of the forward rotating direction and the reverse rotating direction at the restarting, and hence the delay of the driving at the time of start of the operation may be reduced.

Figure 13:
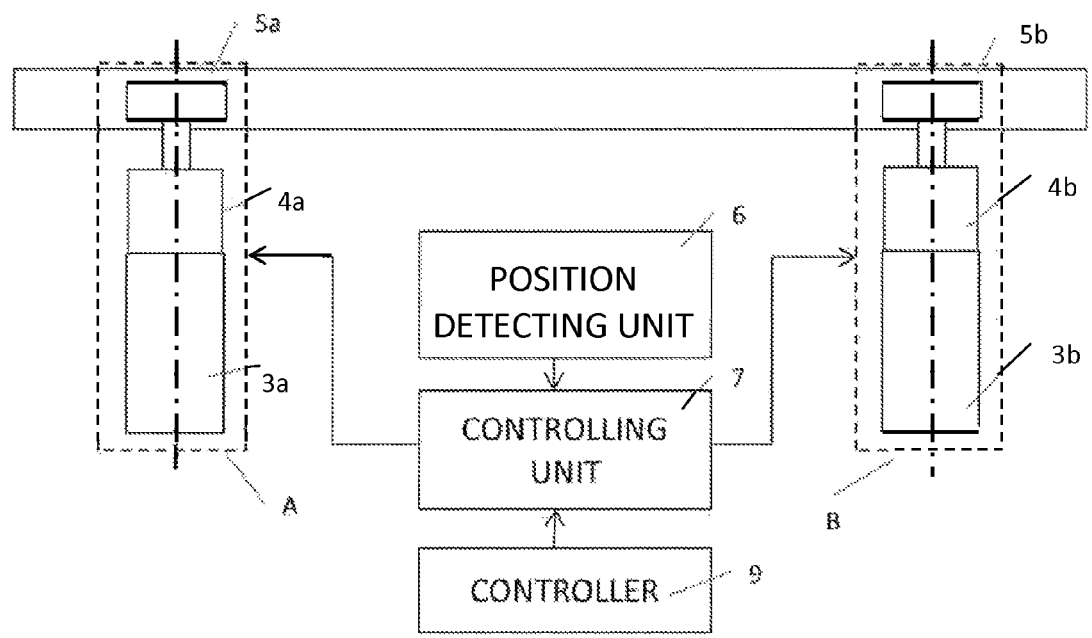
FIG. 13 illustrates a typical structure of a driving force transmitting mechanism using a rack-and-pinion mechanism according to the present invention.
Figure 14:
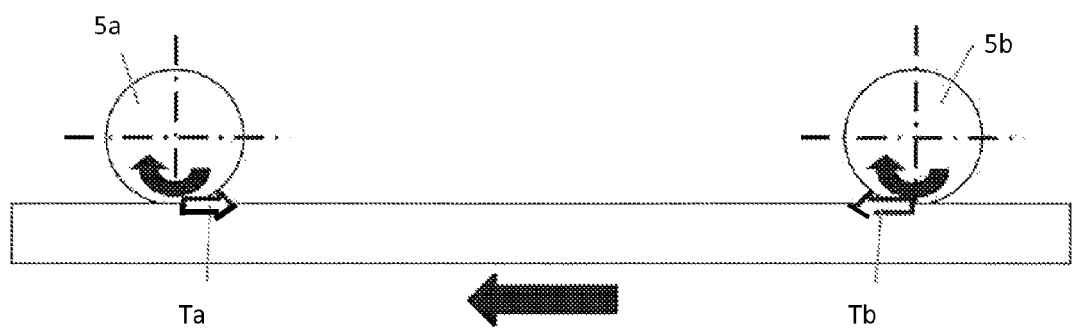
FIG. 14 illustrates a state of driving force transmission between the driven gear and the outputting gear in the case where the driving force transmitting mechanism using a rack-and-pinion mechanism according to the present invention restarts to start the forward operation.
Figure 15:
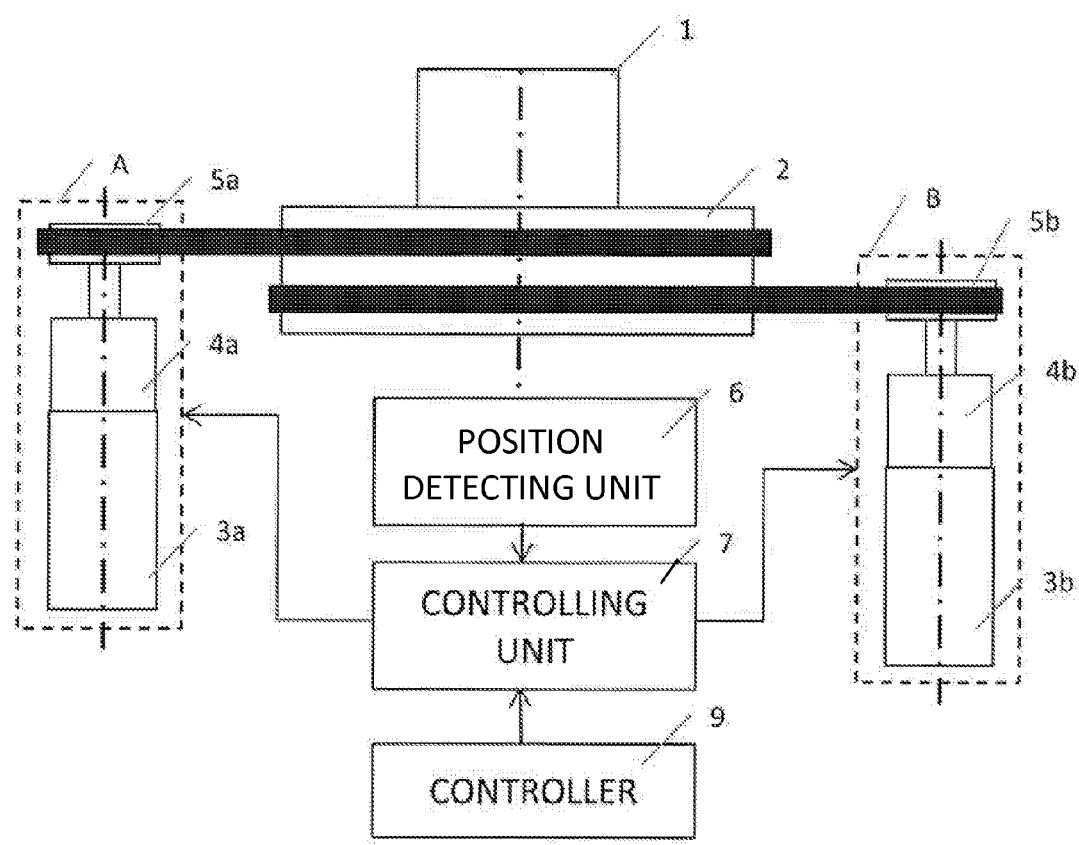
FIG. 15 illustrates a typical structure of a driving force transmitting mechanism using a belt according to the present invention.
Figure 16:
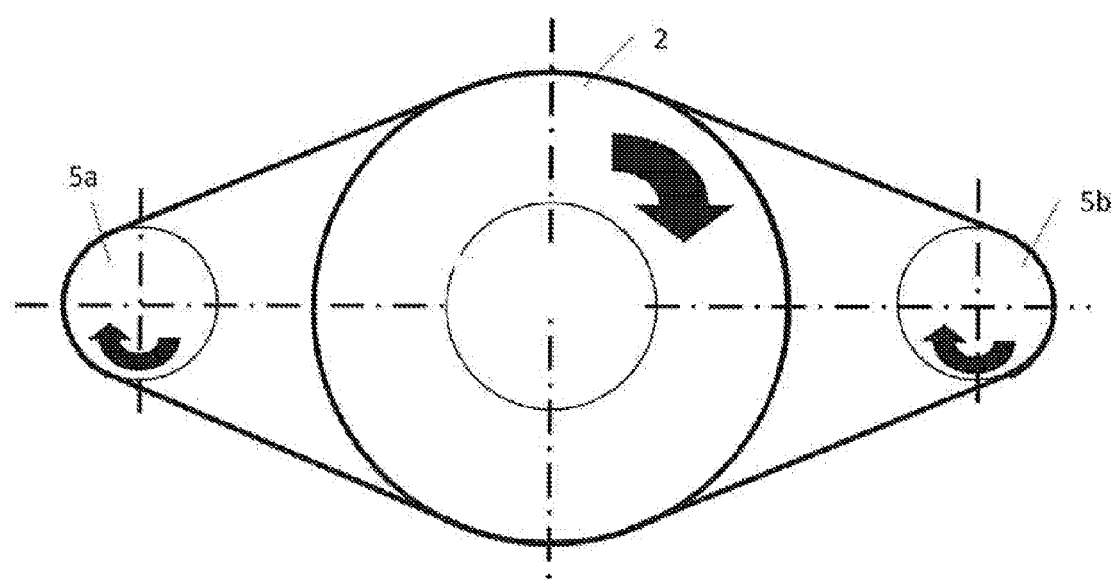
FIG. 16 illustrates a state of driving force transmission between the driven gear and the outputting gear in the case where the driving force transmitting mechanism using a belt according to the present invention restarts to start the forward operation.

This embodiment is based on the assumption that the final output is transferred to the driven unit 1 which is the rotating driven unit, but may be applied to a driven unit including a linear-motion mechanism, for example, a rack-and-pinion mechanism as shown in FIGS. 13 and 14. In a case of a rack-and-pinion type driving mechanism, the outputting gears 5a and 5b correspond to pinion gears and the driven unit 1 corresponds to a rack gear which is linearly driven. In this embodiment, the driving force transmission between the gears (outputting gears 5a and 5b and driven gear 2) which are engaged with each other is described. Even in a case of a driving force transmitting mechanism using a belt as shown in FIGS. 15 and 16, the same effect is obtained. In this embodiment, the use of the DC motor is described. Even in a case where an AC motor is used, the same effect is obtained.

In this embodiment, at the time a when the driven unit reaches the stopping motion starting position (P1) preceding the stop target position by the predetermined amount, the driving unit B starts to rotate in the reverse direction. When feedback control or learning is realized in which a use condition including a driving speed and a driving range or an environmental condition including a temperature is taken into account, the predetermined amount may be set to stop the driven unit at the stop target position, to thereby improve the precision of the actual stop position relative to the stop target position.

The changes in speed of the driven unit 1 at the time a illustrated in FIGS. 2A, 2B, and 2C, the time d illustrated in FIGS. 5A, 5B, and 5C, and the time f illustrated in FIGS. 7A, 7B, and 7C are illustrated for description. When the controlling unit 7 suitably controls the driving units A and B, the changes in speed may be made inconspicuous.

Second Embodiment

A second embodiment of the present invention is described with reference to FIGS. 1, 4A and 4D to 11B.

A driving force transmitting mechanism according to this embodiment has the same structure as that of the first embodiment described with reference to FIG. 1 and thus the description thereof is omitted here.

FIGS. 9A, 9B, and 9C are graphs illustrating operation relationships between the driven unit 1 and the driving units A and B in a case where the driving force transmitting mechanism according to this embodiment comes to a stop.

FIG. 9A illustrates a motor driving signal of the driving unit A and a driving force applied from the outputting gear 5a to the driven gear 2. FIG. 9B illustrates a motor driving signal of the driving unit B and a driving force applied from the outputting gear 5b to the driven gear 2. FIG. 9C illustrates a revolution speed of the driven unit 1.

FIG. 10 illustrates an operation flow in this embodiment.

In Step S201 illustrated in FIG. 10, the controller 9 outputs, to the controlling unit 7, a commanding signal for starting the behaviors of the driving units A and B. In Step S202, the controlling unit 7 drives the DC motors 3a and 3b.

In Step S203, the controlling unit 7 determines whether or not a drive stopping signal for stopping the driving was received from the controller 9. In the case that the drive stopping signal was not received, the processing returns to Step S202 and the controlling unit 7 continues to drive the DC motors 3a and 3b until the drive stopping signal is received.

When the controlling unit 7 received the drive stopping signal from the controller 9 in Step S203, the processing proceeds to Step S204 and control for gradually reducing a driving current for the DC motor 3a starts. Then, the processing proceeds to Step S205.

In Step S205, whether or not the DC motor 3a stopped is determined. In the case that the DC motor 3a did not stop, the processing returns to Step S204 and the driving current for the DC motor 3a is gradually reduced until the DC motor 3a stops. When the stop of the DC motor 3a is determined in Step S205, the processing proceeds to Step S206 and control for gradually reducing a driving current for the DC motor 3b starts. Then, the processing proceeds to Step S207.

In Step S207, whether or not the driven unit 1 stopped is determined. In the case that the driven unit 1 did not stop, the processing returns to Step S206 and the driving current for the DC motor 3b is gradually reduced until the driven gear 2 stops. In the case that the driven unit 1 stopped, the processing proceeds to Step S208 and the DC motor 3b is stopped. In Step S209, the operation is ended.

FIG. 4A illustrates the state of driving force transmission between the driven gear 2 and the outputting gears 5a and 5b during the steady operation. The arrow Ta indicates the direction in which the outputting gear 5a exerts the driving force on the driven gear 2 and the arrow Tb indicates the direction in which the outputting gear 5b exerts the driving force on the driven gear 2. That is, the driving units A and B have no backlash in the directions indicated by the arrows Ta and Tb, respectively. The backlash exists in the directions reverse to the directions indicated by the arrows Ta and Tb.

In FIGS. 9A, 9B, and 9C, when the drive stopping signal is input from the controller 9 to the controlling unit 7 at the time h (Step S203), the current input to the driving unit A gradually reduces (Step S204). The driving unit A stops at a time i. The driving unit B continues to drive with the same driving force until the time i (Step S205). During a period between the time h and the time i, the driven gear 2 is driven by the driving forces of the driving units A and B. In this case, the driving force of the driving unit A reduces, and hence the revolution speed of the driven gear 2 gradually reduces with the driving force reduction.

Figure 11A:
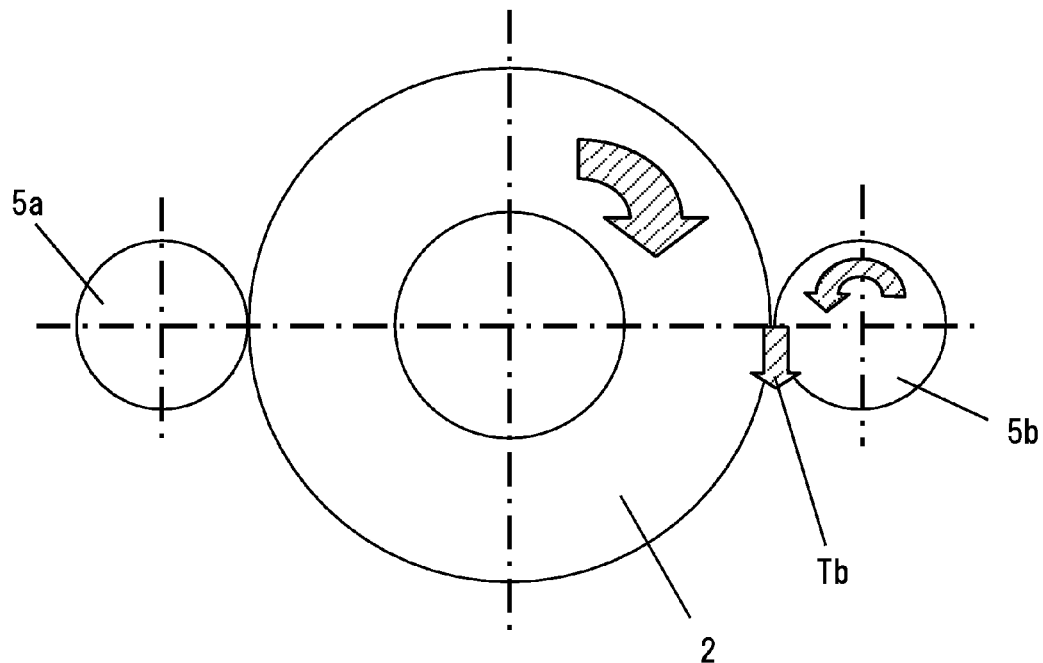
FIG. 11A illustrates a state of driving force transmission between the driven gear and the outputting gears at a time i.

FIG. 11A illustrates a state of driving force transmission between the driven gear 2 and the outputting gears 5a and 5b during a period between the time i and a time j. The outputting gear 5b of the driving unit B continues to rotate in the forward direction, and hence there is no backlash in the direction indicated by the arrow Tb. The driven gear 2 continues to rotate by the driving force applied from the driving unit B (outputting gear 5b), and hence the DC motor 3a stops but the outputting gear 5a continues to rotate by the driven gear 2. However, during the period between the time i and the time j, the backlash exists in the direction reverse to the driving direction. Therefore, as illustrated in FIG. 11A, the driving force does not act between the outputting gear 5a and the driven gear 2.

From the time i illustrated in FIGS. 9A, 9B, and 9C, the current input to the driving unit B gradually reduces to reduce the driving force. The revolution speed of the driven gear 2 gradually reduces with the driving force reduction (Step S206). The driven gear 2 transfers the driving force of the driving unit B to the reducer 4a through the outputting gear 5a.

Figure 11B:
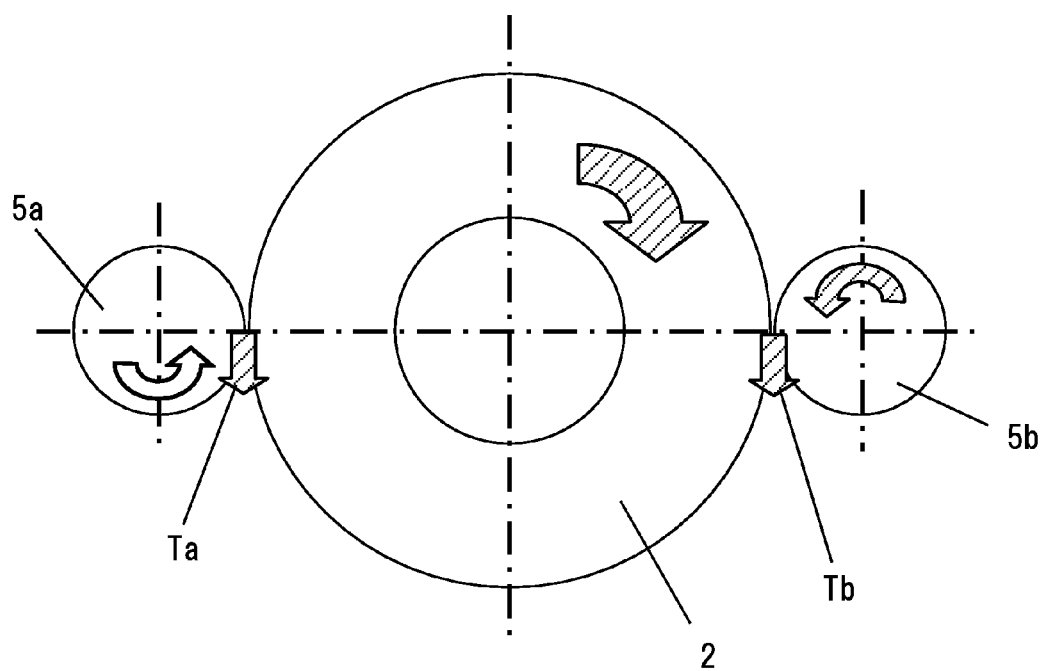
FIG. 11B illustrates a state of driving force transmission between the driven gear and the outputting gears at a time j.

From the time j illustrated in FIGS. 9A, 9B, and 9C, the backlash is eliminated by the rotation of the driven gear 2, and hence the DC motor 3a is rotated by the driving force from the driven gear 2. FIG. 11B illustrates a state of driving force transmission between the driven gear 2 and the outputting gears 5a and 5b at this time. In this case, the DC motor 3a may rotate by a reverse input from the outputting gear 5a, and hence a counter-electromotive force of the DC motor 3a acts as a load to the DC motor 3b. Therefore, during the period between the time j and a time k, as illustrated in FIG. 9C, a deceleration of rotation of the driven gear 2 increases.

At the time k illustrated in FIGS. 9A, 9B, and 9C, a breaking force corresponding to the counter-electromotive force of the DC motor 3a becomes equal to the driving force of the DC motor 3b, and hence the driven gear 2 stops (Step S207).

After that, the current input to the driving unit B becomes 0 (Step S208). At a time l illustrated in FIGS. 9A, 9B, and 9C, the driven gear 2 comes to rest in the state illustrated in FIG. 4D (Step S209). In this case, the direction Ta in which there is no backlash of the driving unit A and the direction Tb in which there is no backlash of the driving unit B are reverse to each other, and hence the driven gear 2 is held from the rotating directions different from each other.

In a case where the motors are locked with this state, even when the external force is applied to the driven unit 1, the driving units of the motors do not rotate and the driven gear 2 remains at rest. The rotation of the DC motors 3a and 3b may be locked by short-circuiting between the two electrodes in each of the DC motors 3a and 3b.

The behavior in each of the cases of restarting in the forward rotating direction from the stop state illustrated in FIG. 4D and restarting in the reverse rotating direction therefrom is the same as the behaviors described with reference to FIGS. 5A to 5C and 6 to 8 in the first embodiment, and thus the description thereof is omitted here.

As described above, according to the second embodiment of the present invention, one of the driving units reduce its speed and stops before the other driving unit stops to act as a load to the other driving unit, and hence the driving force transmitting mechanism may gradually stop. Therefore, a high-level operation may be performed for photographing. The one driving unit acts as the load to the other driving unit, and hence the driven gear may be reliably held from the rotating directions different from each other at the time of coming to a stop without depending on the backlash amount.

Restarting may be performed in any of the forward rotation and the reverse rotation from the state in which there is no backlash, and hence the delay of the driving at the time of start of the operation may be reduced.

This embodiment is based on the assumption that the final output is the rotation of the driven unit 1, but may be applied to a linear-motion mechanism, for example, a rack-and-pinion mechanism as shown in FIGS. 13 and 14. In this embodiment, the driving force transmission using the gears is described. Even in a case of a driving force transmitting mechanism using a belt as shown in FIGS. 15 and 16, the same effect is obtained. In this embodiment, the use of the DC motor is described. Even in a case where an AC motor is used, the same effect is obtained.

The changes in speed of the driven unit 1 at the time d illustrated in FIG. 5C and the time f illustrated in FIG. 7C are illustrated for description. When the controlling unit 7 suitably controls the driving units A and B, the changes in speed may be made inconspicuous.

Third Embodiment

A third embodiment of the present invention is described with reference to FIGS. 1 and 12.

FIG. 1 illustrates the typical structure of the driving force transmitting mechanism according to the present invention.

Figure 12:
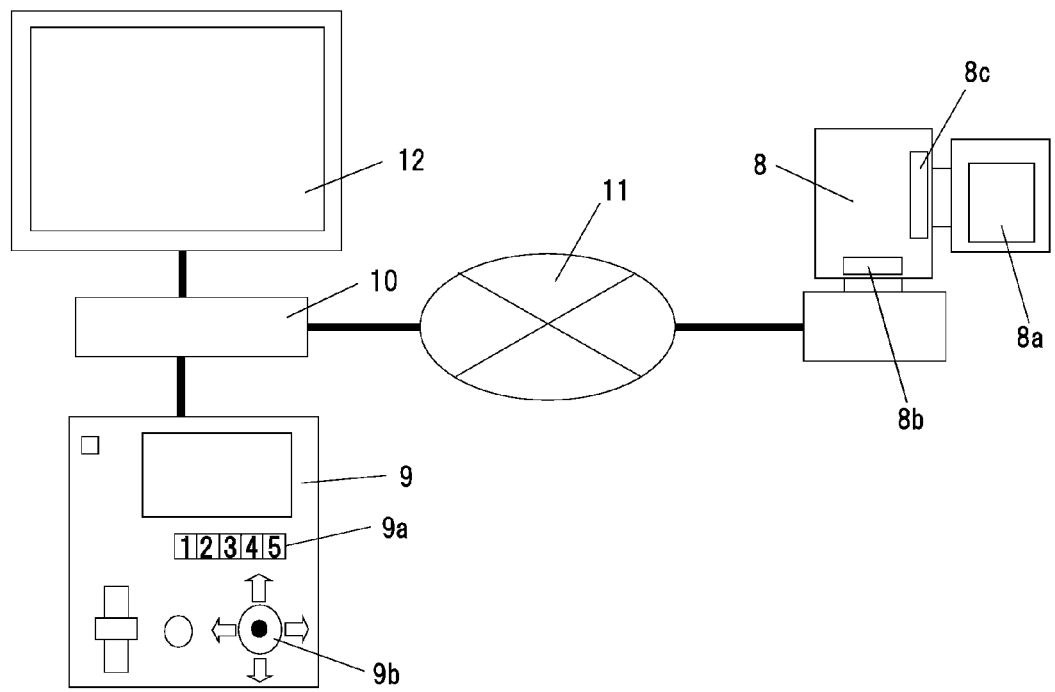
FIG. 12 is a schematic diagram illustrating a camera platform system including a camera platform device provided with the driving force transmitting mechanism according to the present invention.

FIG. 12 is a schematic diagram illustrating a camera platform system including a camera platform device provided with the driving force transmitting mechanism according to the present invention. The camera platform device herein performs pan driving or tilt driving on an image pickup device (imaging optical system) (not shown). In the pan driving, the image pickup device is driven in the horizontal direction (lateral direction). In the tilt driving, the image pickup device is driven in the perpendicular direction (longitudinal direction). The image pickup device may be an optical device including an image taking optical system and an observing optical system.

The driven gear 2 connected to the driven unit 1 of at least one of a pan driving unit 8b and a tilt driving unit 8c of a camera platform device 8 (image pickup device mounted on camera platform device) is driven by the driving units A and B.

The camera platform device 8 receives a signal from the controller 9 through a distributor 10 and a network 11 and operates.

The image pickup device is mounted on a camera housing 8a of the camera platform device 8. A image signal from the image pickup device is displayed on a displaying device 12 through the network 11 and the distributor 10.

The controller 9 includes a position signal sending switch 9a and a speed signal sending switch 9b.

When an operator operates the position signal sending switch 9a, the pan driving and the tilt driving are performed up to predetermined angles to change the orientation of the image pickup device. In this case, at a timing when the driven unit 1 reaches a position preceding the stop target position by a predetermined amount, an equal magnitude signal for performing the reverse rotating motion is input to the driving unit A. The driving unit B continues the same behavior as before. The driving unit B continues to drive but the driving unit A drives with the equal magnitude driving power in the reverse direction. Therefore, the driving forces of the driving units A and B are balanced with each other, and hence the driven gear 2 stops.

When the operator operates the speed signal sending switch 9b, the pan driving and the tilt driving are performed at speeds indicated by speed signals in respective directions to change the orientation of the image pickup device. In this case, when the speed signals become 0, the current input to the driving unit A gradually reduces and then the driving unit A stops. The driving unit B continues the same operation as before. After that, the current input to the driving unit B is gradually reduced, but the DC motor $3a$ of the driving unit A is driven by the driving unit B through the driven gear 2, the outputting gear $5a$, and the reducer $4a$ to generate a counter-electromotive force. The counter-electromotive force of the DC motor $3a$ acts as the load to the DC motor $3b$. When the counter-electromotive force of the DC motor $3a$ becomes equal to the driving force of the DC motor $3b$, the DC motor $3b$ stops.

As described above, according to the third embodiment of the present invention, one of the driving units performs the reverse rotating motion at the time of coming to a stop in the case where the camera platform device 8 has behaviors in response to the position signal. Therefore, the driven gear may be more rapidly stopped to a desired position than in the case where the reverse rotating motion is not performed. Thus, the driven gear may be stopped at a more accurate position, and hence the driving precision of the camera platform device is improved.

One of the driving units stops at the time of coming to a stop in the case where the camera platform device 8 has behaviors in response to a speed signal, and then acts as the load to the other driving unit, and hence gradual stopping is performed. Therefore, a high-level operation may be performed for image taking.

Even when the camera platform device has behaviors in response to any one of the position signal and the speed signal, the driven gear stops while being sandwiched by the two driving units, and hence it is less likely to cause a position deviation by an external force. Therefore, even when a wind or vibration is applied to the camera platform device, an unnecessary vibration is inhibited from entering an image obtained by image taking.

Even when the pan or tilt operation restarts, the driven gear starts to drive in both driving directions from the state in which there is no backlash, and hence a camera platform device which has behaviors with less driving delay may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-081604, filed Mar. 31, 2010, which is hereby incorporated by reference herein in its entirety.

What is claimed is:

1. A driving force transmitting device for driving a driven unit, comprising:
    a first driving unit;
    a second driving unit;
    a driving force-transmitted portion which is attached to the driven unit and to which a driving force of the first driving unit and a driving force of the second driving unit are transmitted; and
    a controlling unit for separately controlling current input to the first driving unit and the second driving unit,
    wherein a driving force transmitting portion of the first driving unit and a driving force transmitting portion of the second driving unit transmit the driving forces to the driving force-transmitted portion at different positions of the driving force-transmitted portion; and
    wherein when the driven unit which is being driven is to be stopped, the controlling unit inputs the current to the first driving unit to drive in a direction reverse to a driving direction while inputting the current to the second driving unit to continue to drive, thereby causing the first driving unit and the second driving unit to stop in a state in which the driving forces of the first driving unit and the second driving unit are balanced with each other.

2. A driving force transmitting device according to claim 1, wherein, after the driven unit is stopped, a driving portion of the first driving unit and a driving portion of the second driving unit are locked so as not to be shifted by an external force from the driven unit.

3. A driving force transmitting device according to claim 1, wherein, when the driven unit is to be driven, the controlling unit simultaneously sends the same signal to the first driving unit and the second driving unit.

4. A driving force transmitting device according to claim 1, wherein the driving force is transmitted between the driving force-transmitted portion and each of the driving force transmitting portion of the first driving unit and the driving force transmitting portion of the second driving unit through gears which are engaged with each other.

5. A driving force transmitting device according to claim 4, wherein the driving force-transmitted portion, the driving force transmitting portion of the first driving unit, and the driving force transmitting portion of the second driving unit serve as a rack-and-pinion in which the driving force-transmitted portion comprises a rack gear and the each of the driving force transmitting portion of the first driving unit and the driving force transmitting portion of the second driving unit comprises a pinion gear.

6. A driving force transmitting device according to claim 1, wherein the driving force is transmitted between the driving force-transmitted portion and each of the driving force transmitting portion of the first driving unit and the driving force transmitting portion of the second driving unit through a belt.

7. A camera platform device including an optical device mounted thereto, for performing at least one of a pan behavior and a tilt behavior of the optical device in response to a commanding signal received from a commanding unit,
    the camera platform device comprising the driving force transmitting device according to claim 1, for driving the optical device,
    wherein the at least one of the pan behavior and the tilt behavior is performed by the driving force transmitting device.

8. A driving force transmitting device for driving a driven unit, comprising:
    a first driving unit;
    a second driving unit;
    a driving force-transmitted portion which is attached to the driven unit and to which a driving force of the first driving unit and a driving force of the second driving unit are transmitted; and
    a controlling unit for separately controlling current input to the first driving unit and the second driving unit,
    wherein a driving force transmitting portion of the first driving unit and a driving force transmitting portion of the second driving unit transmit the driving forces to the driving force-transmitted portion at different positions of the driving force-transmitted portion; and
    wherein when the driven unit which is being driven is to be stopped, the controlling unit gradually reduces the current input to the first driving unit to stop the first driving unit while inputting the current to the second driving unit to continue to drive, then gradually reduces the current input to the second driving unit to drive the first driving unit as a load with the driving force of the second driving unit, and then gradually reduces the current input to the second driving unit to stop.

9. A driving force transmitting device according to claim 8, wherein, after the driven unit is stopped, a driving portion of the first driving unit and a driving portion of the second driving unit are locked so as not to be shifted by an external force from the driven unit.

10. A driving force transmitting device according to claim 8, wherein, when the driven unit is to be driven, the controlling unit simultaneously sends the same signal to the first driving unit and the second driving unit.

11. A driving force transmitting device according to claim 8, wherein the driving force is transmitted between the driving force-transmitted portion and each of the driving force transmitting portion of the first driving unit and the driving force transmitting portion of the second driving unit through gears which are engaged with each other.

12. A driving force transmitting device according to claim 11, wherein the driving force-transmitted portion, the driving force transmitting portion of the first driving unit, and the driving force transmitting portion of the second driving unit serve as a rack-and-pinion in which the driving force-transmitted portion comprises a rack gear and the each of the driving force transmitting portion of the first driving unit and the driving force transmitting portion of the second driving unit comprises a pinion gear.

13. A driving force transmitting device according to claim 8, wherein the driving force is transmitted between the driving force-transmitted portion and each of the driving force transmitting portion of the first driving unit and the driving force transmitting portion of the second driving unit through a belt.

14. A camera platform device including an optical device mounted thereto, for performing at least one of a pan behavior and a tilt behavior of the optical device in response to a commanding signal received from a commanding unit,
the camera platform device comprising the driving force transmitting device according to claim 8, for driving the optical device,
wherein the at least one of the pan behavior and the tilt behavior is performed by the driving force transmitting device.

15. A driving force transmitting device for driving a driven unit, comprising:
a first driving unit;
a second driving unit;
a driving force-transmitted portion which is connected to the driven unit and to which a driving force of the first driving unit and a driving force of the second driving unit are transmitted;
a controlling unit for separately controlling the first driving unit and the second driving unit; and
a commanding unit for outputting, to the controlling unit, a commanding signal for driving the driven unit,
wherein a driving force transmitting portion of the first driving unit and a driving force transmitting portion of the second driving unit transmit the driving forces to the driving force-transmitted portion at different positions of the driving force-transmitted portion; and wherein when the driven unit which is being driven is to be stopped:
in a case that the commanding signal from the commanding unit is a signal for commanding a stop position of the driven unit, the controlling unit causes the first driving unit to drive in a direction reverse to a driving direction while the second driving unit continues to drive, and then causes the first driving unit and the second driving unit to stop in a state in which the driving forces of the first driving unit and the second driving unit are balanced with each other; and
in a case that the commanding signal from the commanding unit is a signal for commanding a driving speed of the driven unit, the controlling unit gradually reduces the driving force of the first driving unit to stop the first driving unit while the second driving unit continues to drive, then gradually reduces the driving force of the second driving unit to drive the first driving unit as a load with the driving force of the second driving unit, and then causes the second driving unit to stop.

16. A driving force transmitting device according to claim 15, wherein, after the driven unit is stopped, a driving portion of the first driving unit and a driving portion of the second driving unit are locked so as not to be shifted by an external force from the driven unit.

17. A driving force transmitting device according to claim 15, wherein, when the driven unit is to be driven, the controlling unit simultaneously sends the same signal to the first driving unit and the second driving unit.

18. A driving force transmitting device according to claim 15, wherein the driving force is transmitted between the driving force-transmitted portion and each of the driving force transmitting portion of the first driving unit and the driving force transmitting portion of the second driving unit through gears which are engaged with each other.

19. A driving force transmitting device according to claim 18, wherein the driving force-transmitted portion, the driving force transmitting portion of the first driving unit, and the driving force transmitting portion of the second driving unit serve as a rack-and-pinion in which the driving force-transmitted portion comprises a rack gear and the each of the driving force transmitting portion of the first driving unit and the driving force transmitting portion of the second driving unit comprises a pinion gear.

20. A driving force transmitting device according to claim 15, wherein the driving force is transmitted between the driving force-transmitted portion and each of the driving force transmitting portion of the first driving unit and the driving force transmitting portion of the second driving unit through a belt.

21. A camera platform device including an optical device mounted thereto, for performing at least one of a pan behavior and a tilt behavior of the optical device in response to a commanding signal received from a commanding unit,
the camera platform device comprising the driving force transmitting device according to claim 15, for driving the optical device,
wherein the at least one of the pan behavior and the tilt behavior is performed by the driving force transmitting device.

* * * * *